May 6, 1924.
R. B. LILLARD
LOCKING DEVICE FOR STEERING WHEELS
Original Filed Dec. 24, 1919    3 Sheets-Sheet 1
1,492,645
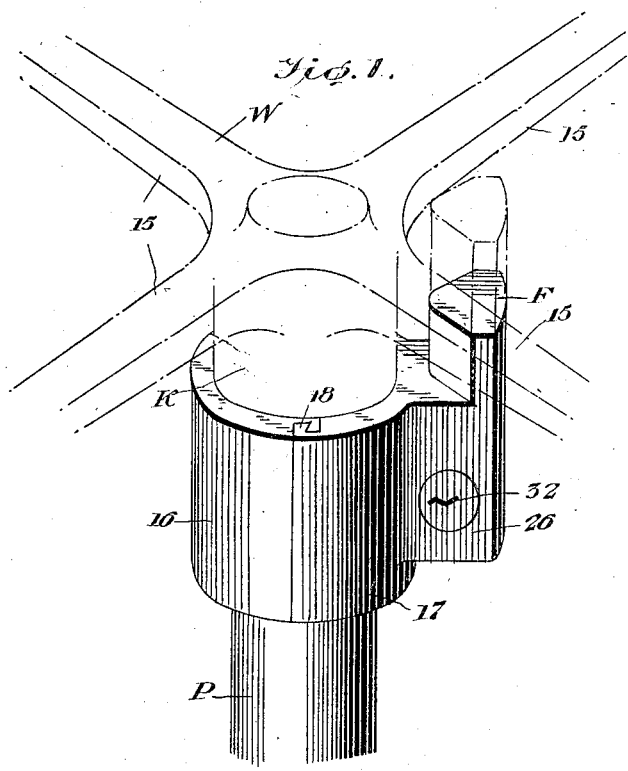
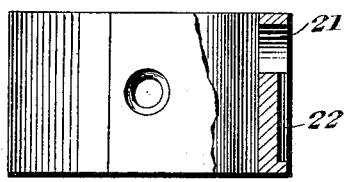
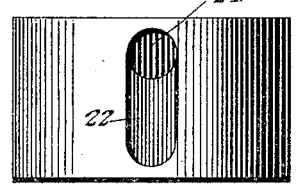
WITNESSES
INVENTOR
R. B. Lillard,
BY
ATTORNEYS May 6, 1924.
R. B. LILLARD
LOCKING DEVICE FOR STEERING WHEELS
Original Filed Dec. 24, 1919    3 Sheets-Sheet 2
1,492,645
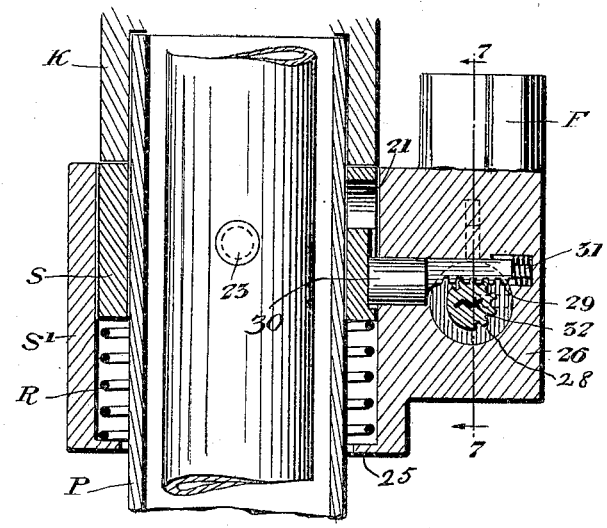
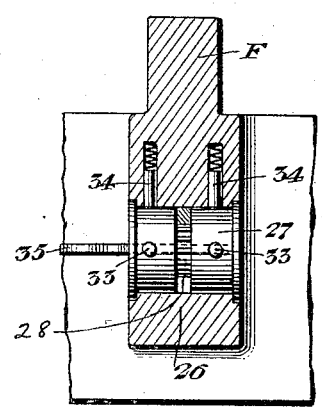
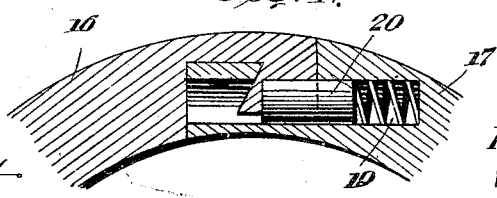
WITNESSES
INVENTOR
R. B. Lillard,
BY
ATTORNEYS May 6, 1924.

R. B. LILLARD 1,492,645

LOCKING DEVICE FOR STEERING WHEELS

Original Filed Dec. 24, 1919    3 Sheets-Sheet 3

WITNESSES
R. E. Rousseau

INVENTOR
R. B. Lillard,
BY
ATTORNEYS

Patented May 6, 1924.

1,492,645

UNITED STATES PATENT OFFICE.

RUFUS BIBB LILLARD, OF NEWARK, NEW JERSEY.

LOCKING DEVICE FOR STEERING WHEELS.

Application filed December 24, 1919, Serial No. 347,091. Renewed August 29, 1923.

*To all whom it may concern:*

Be it known that I, RUFUS BIBB LILLARD, a citizen of the United States, and a resident of Newark, in the county of Essex and State of New Jersey, have invented certain new and useful Improvements in Locking Devices for Steering Wheels, of which the following is a specification.

My invention relates generally to locking devices for preventing theft of motor vehicles, and particularly to a device adapted to lock the steering wheel of the vehicle.

It is a purpose of my invention to provide a device of the above described character in which the locking function is secured through a member which is carried by the steering post and engages the spokes of the steering wheel to prevent rotation of the latter, my device being of simple and efficient construction and capable of ready application to any steering post of the ordinary construction.

It is also a purpose of my invention to provide a locking device in which a steering post is constructed to form part of the locking device thereby eliminating certain parts and materially simplifying the invention.

In the accompanying drawings:—

Figure 1 is a view, showing in perspective one form of locking device embodying my invention in applied position upon a steering post, the steering wheel in the present instance being shown in phantom;

Figure 2 is a vertical sectional view of Figure 1;

Figure 3 is a view, showing in top plan the inner sleeve of the locking device shown in Figures 1 and 2, a part of such sleeve being shown in section;

Figure 4 is an enlarged view of the sectional portion shown in Figure 3;

Figures 5 and 6 are further detail views of the inner sleeve;

Figure 7 is a vertical sectional view, taken on the line 7—7 of Figure 2;

Similar reference characters refer to similar parts in each of the several views.

Figure 8:
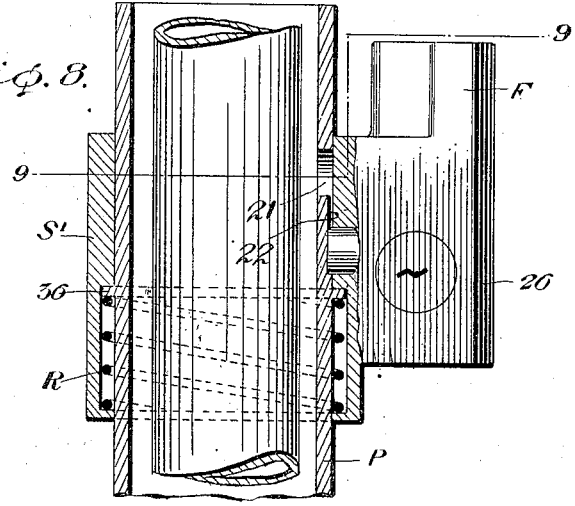
Figure 8 is a view, showing in vertical section another form of locking device embodying my invention in which the steering post constitutes a part of the device.

Referring specifically to the drawings, and particularly to Figures 1 and 2, P designates a steering column upon the upper end of which is rotatably mounted a steering wheel W including the spokes 15 which are arranged in the usual manner, as clearly shown in Figure 1. The steering wheel W is rotatably mounted upon the post P by means of a collar K, and embracing the column at a point directly below the collar K is the locking device embodying the subject-matter of my invention. This locking device comprises an inner sleeve S which embraces the column P, and an outer sleeve S' which embraces the inner sleeve and carries a locking finger F which is adapted in its active position to be interposed between any two adjacent spokes of the wheel W for locking the wheel against rotation upon the column.

As shown in Figures 3 and 4, the inner sleeve S is comprised of a pair of semi-circular sections 16 and 17 which are connected at their confronting ends by a tongue and groove connection generally indicated at 18. This tongue and grooved connection 18 is such that the sections are assembled by moving their ends laterally toward each other so that the tongues interlock and prevent radial movement of the sections. To prevent disengagement of the ends of the sections by moving them laterally, I provide pockets 19 in which are mounted spring pressed pins 20. This construction as well as the detail construction of the meeting ends of the sections is shown in Figures 3 and 4. As shown in Figures 5 and 6, the inner sleeve S is provided adjacent its upper end with a circular aperture 21 which functions as a keeper for a locking bolt, as will be hereinafter described. Below and communicating with the aperture 22 is a slot 22 which terminates adjacent the lower edge of the sleeve S. This slot 22 provides a channel for a locking key as will be hereinafter described. As shown in Figure 2, the inner sleeve embraces the steering column P at a point directly below the collar K and is secured upon the steering column against rotation by means of a rivet 23 which extends through an opening 24 in the sleeve and through the wall of the steering column.

It will be understood that when the inner sleeve 8 is applied to the steering column, the sections 16 and 17 are applied separately and then their ends are locked together as has been described.

The outer sleeve S' is also comprised of two separate sections which are connected in a manner identical to the sections 16 and 17 of the inner sleeve S. As shown in Figure 2, the sleeve S' is provided at its lower end with an inturned annular flange 25 that serves to properly space and support the sleeve on the column. Surrounding the column beneath the sleeve S' and interposed between the sleeve S and the flange 25 is an expansible spring R. The outer sleeve S' has a sliding fit on the inner sleeve S as well as the collar K and is thereby capable of vertical movement upon the steering column. The spring R serves to urge the sleeve S' downwardly to the position shown in Figure 2 and when the sleeve is moved upwardly it will be understood that it is moved against the tension of the spring R.

The locking finger F hereinbefore referred to is formed integrally with one of the sections comprising the sleeve S' and as shown in Figure 1, such finger is of substantially L-shaped formation, its horizontal portion or base 26 constituting a casing for a conventional form of pin lock. As shown in Figures 2 and 7, the lock in the present instance comprises a body 27 rotatably mounted within the body portion 26 and formed intermediate its ends with a segmental gear 28 which is adapted to engage a rack 29 formed on the locking bolt 30. The locking bolt 20 is normally projected from the body portion 26 by means of a spring 31 and in its projected position such bolt is adapted to engage the inner sleeve S, as clearly shown in Figure 2. The body 27 is provided with a key-way 32 for the reception of a key 35, such key being adapted to actuate the body to effect a retraction of the locking bolt 30. The rotation of the body 27 is controlled by a pair of locking pins 33 mounted within the body 27 and a pair of spring pressed locking pins 34 mounted within the body portion 26, as clearly shown in Figure 7. In the normal position of the fingers 34 they are projected into the openings in the body 27 for the fingers 33 so that rotation of the body is prevented. However, when the key is inserted within the key-way 32, the fingers 33 are moved outwardly and against the fingers 34 thus forcing the latter free of the body and allowing the rotation of the same.

In the operation of the lock, the sleeve S' under the action of the spring R normally occupies an inactive or lowered position, as shown in Figure 2, wherein the locking bolt 30 is disposed at the lower end of the slot 22. In this position of the sleeve S' the locking finger F is disposed below the spokes 15 of the wheel so that rotation of the wheel is unrestricted. When it is desired to lock the wheel W against movement upon the steering column, the locking finger F is elevated to the position shown in dash lines in Figure 1, by manually lifting the sleeve S' against the tension of the spring R. With the sleeve S in the elevated position the locking bolt 20 automatically moves into the opening 21 under the action of the spring 31 and thus locking the sleeve in elevated position and preventing downward movement of the finger F. It will, therefore, be seen that the locking finger now prevents rotation of the steering wheel W.

When it is desired to release the steering wheel, the locking finger F is lowered to its normal position by the retraction of the locking bolt 30 through the manipulation of the lock as has been previously described.

Figure 9:
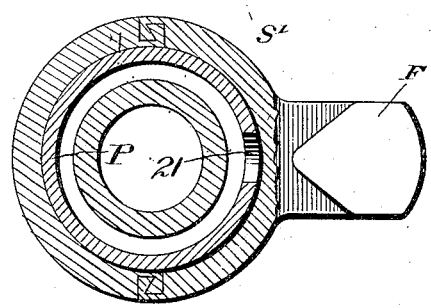
Figure 9 is a sectional view, taken on the line 9—9 of Figure 8.

Referring now to Figures 8 and 9, I have here shown another form of locking device which is identical to the first form with the exception that the steering column P is formed with the opening 21 and the slot 22 and an annular shoulder 36 so that it performs the function of the sleeve S and eliminates the use of the latter. As shown in Figure 8, the sleeve S' embraces the steering column P and is held in its lowered position by means of the spring arm which bears against the shoulder 36. In this form of my invention it is necessary to modify the construction of the ordinary steering column to a slight extent whereas in the first form of my invention the locking device may be applied to any steering column of the standard construction.

Although I have herein shown and described only two forms of locking device embodying my invention, it is to be understood that various changes and modifications may be resorted to without departing from the spirit of the invention and the spirit and scope of the appended claims.

Having thus described my invention, I claim:

1. A locking device for steering wheels comprising a stationary sleeve and a movable sleeve, each of said sleeves comprising approximately semi-circular separable sections, a locking finger carried by the semi-circular section of the movable sleeve, and means for locking the movable sleeve against movement upon the stationary sleeve.

2. A locking device for steering wheels comprising a stationary sleeve and a movable sleeve, each of said sleeves comprising sections, tongue and grooved connections between said sections, means for locking said connections together to prevent separation of said sections, a locking finger carried by the movable sleeve, and means for locking the movable sleeve against movement.

3. A locking device for steering wheels comprising, a stationary sleeve adapted to embrace the steering column, a movable sleeve slidable longitudinally of the stationary sleeve, both of said sleeves comprising separable sections, an inturned flange formed on the movable sleeve, a coiled spring interposed between the stationary sleeve and engaging said flange for urging the movable sleeve downwardly, a locking finger carried by the movable sleeve and adapted to be interposed between the spokes of a steering wheel when the movable sleeve is elevated against the tension of said spring, and means carried by the movable sleeve for locking the same in elevated position and for limiting its movement downwarly through the action of said spring.

4. A locking device for steering wheels comprising, a stationary sleeve, a movable sleeve, each of said sleeves comprising separable sections, means for urging the movable sleeve downwardly with respect to its steering wheel, a locking finger carried by the movable sleeve and adapted to be interposed between the spokes of a steering wheel when the sleeve is moved to an elevated position against the urging means, and means for locking the movable sleeve in the elevated position and for defining the lower extreme position thereof.

5. In an automobile lock, the combination with a tubular member, of a sleeve slidable thereon and having means for holding the steering wheel against rotation, a locking member carried by said sleeve for locking the sleeve against sliding movement, said sleeve being formed with an inturned flange spacing the sleeve from the tubular member and a coiled spring surrounding said tubular member and engaging said flange to urge the sleeve to its inoperative position.

RUFUS BIBB LILLARD.